(12) United States Patent
Jensen et al.

(10) Patent No.: US 11,577,465 B2
(45) Date of Patent: Feb. 14, 2023

(54) ADDITIVE MANUFACTURING HAVING OPTICAL PROCESS MONITORING

(71) Applicant: HEXAGON TECHNOLOGY CENTER GMBH, Heerbrugg (CH)

(72) Inventors: Thomas Jensen, Rorschach (CH); Zheng Yang, Friedrichshafen (DE); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 689 days.

(21) Appl. No.: 16/430,805

(22) Filed: Jun. 4, 2019

(65) Prior Publication Data

US 2019/0381736 A1 Dec. 19, 2019

(30) Foreign Application Priority Data

Jun. 15, 2018 (EP) ..................... 18178024

(51) Int. Cl.
*B29C 67/00* (2017.01)
*B29C 64/393* (2017.01)
(Continued)

(52) U.S. Cl.
CPC ............ *B29C 64/393* (2017.08); *B22F 10/20* (2021.01); *G01B 11/2518* (2013.01);
(Continued)

(58) Field of Classification Search
CPC ....... B29C 64/393; B33Y 10/00; B33Y 30/00; B33Y 50/00; B33Y 50/02; G01B 11/2518; H04N 5/2258
See application file for complete search history.

(56) References Cited

U.S. PATENT DOCUMENTS

| 5,402,582 A | 4/1995 | Simon |
| 2015/0024233 A1 | 1/2015 | Gunther |

(Continued)

FOREIGN PATENT DOCUMENTS

| CN | 104471475 A | 3/2015 |
| CN | 105499567 A | 4/2016 |

(Continued)

OTHER PUBLICATIONS

William S Land et al.: "In-Situ Metrology System for Laser Powder Bed Fusion Additive Process" Procedia Manufacturing, Bd. 1, Jan. 1, 2015.

(Continued)

*Primary Examiner* — Ryan M Ochylski
(74) *Attorney, Agent, or Firm* — Maschoff Brennan

(57) ABSTRACT

A system for monitored additive manufacturing of an object, comprising a manufacturing unit], designed for additive manufacturing of the object based on metal-containing manufacturing material in a manufacturing volume, wherein the object is built up by repeated layer-by-layer provision of the manufacturing material in defined quantity and accurately-positioned forming of the provided manufacturing material. The system moreover comprises an optical checking unit having at least one projector and two cameras and a control and processing unit. The manufacturing volume comprises an optical transmission region, the projector and cameras—are arranged outside the manufacturing volume in a fixed position relationship and are aligned in such a way that respective optical axes extend through a respective transmission region, by means of the projector, a projection can be generated on a manufacturing area and at least a common part of the manufacturing area on which the projection can be overlaid can be captured.

6 Claims, 2 Drawing Sheets

(51) Int. Cl.
*G01B 11/25* (2006.01)
*H04N 5/225* (2006.01)
*B22F 10/20* (2021.01)
*B33Y 10/00* (2015.01)
*B33Y 30/00* (2015.01)
*B33Y 50/02* (2015.01)

(52) U.S. Cl.
CPC ............ *H04N 5/2258* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0236279 A1 | 8/2016 | Ashton et al. | |
| 2019/0128666 A1* | 5/2019 | Lau | G01B 11/2545 |

FOREIGN PATENT DOCUMENTS

| | | |
|---|---|---|
| CN | 107053663 A | 8/2017 |
| CN | 107727011 A | 2/2018 |
| CN | 107810102 A | 3/2018 |
| DE | 43 25 337 A1 | 2/1994 |
| DE | 43 25 347 A1 | 2/1994 |
| DE | 102012011217 A1 | 12/2013 |
| EP | 1 474 650 B1 | 6/2007 |
| WO | 2014/006500 A2 | 1/2014 |
| WO | 2016/207258 A1 | 12/2016 |
| WO | 2017085468 A1 | 5/2017 |

OTHER PUBLICATIONS

Bin Zhang et al.: "In situ surface topography of laser powder bed fusion using fringe protection" Additive Manufacturing, Bd. 12, Nr. Pt. A, Sep. 30, 2016.
European Search Report dated Oct. 1, 2018 as received in Application No. 18178024.8.
Li Wenfang, Photography and Creativity, Liaoning Fine Arts Publishing House Co, Ltd., 30.06.2015, pp. 82-83.
Wang Yongxin, Qiu Zhihui, Reverse Engineering and Detection Technology and Application (title of textbook), Xi'an Jiaotong University Press, 1. edition May 2014 (publication date: May 31, 2014), p. 88.

* cited by examiner

ADDITIVE MANUFACTURING HAVING OPTICAL PROCESS MONITORING

CROSS-REFERENCE TO RELATED APPLICATIONS

This application claims priority to European Patent Application No. 18178024, filed on Jun. 15, 2018. The foregoing patent application is herein incorporated by reference.

FIELD OF INVENTION

The invention relates to a method for checking the production of an object by means of additive manufacturing and a corresponding device.

BACKGROUND

In many technical areas of application, the requirement exists of measuring objects at high accuracy or with respect to the composition thereof. This applies in particular to the manufacturing industry, for which the measurement and checking of surfaces of workpieces has a high level of significance, in particular also for the purposes of quality control.

Coordinate measuring machines, for example, which enable a precise measurement of the geometry of an object surface, typically at micrometer accuracy, are used for such applications. Objects to be measured can be engine blocks, transmissions, and tools, for example. Known coordinate measuring machines measure the surface by establishing a mechanical contact and scanning the surface. Examples thereof are gantry measuring machines as described, for example, in DE 43 25 337 or DE 43 25 347. Another system is based on the use of an articulated arm, the measuring sensor of which, which is arranged at the end of the multipart arm, can be moved along the surface. Generic articulated arms are described, for example, in U.S. Pat. No. 5,402,582 or EP 1 474 650.

Coordinate surface measurement permits the establishment of geometric deviations on the workpiece from corresponding target values. A high-accuracy specification for manufacturing precision can thus be made with respect thereto. It can thus be established whether shape and dimensioning of the produced part lie within a specified tolerance and the component is to be considered to be a discard or a good part.

In particular, the geometrical consideration of the object surface naturally and typically leaves the condition of the object in its body interior out of consideration. Items of information with respect to possible material flaws or material fractures remain inaccessible.

However, such object properties, which no longer solely relate to the geometry of the workpiece, are gaining further significance due to the refinement of specific manufacturing methods. Apart from traditional manufacturing methods such as milling, grinding, polishing, welding, or soldering, in particular additive manufacturing or 3D printing are to be mentioned here. Up to now tolerances with respect to the material removal have stood in the foreground as variables to be considered for cutting material processing, but the relevant parameters in the case of additive manufacturing are typically different.

Additive manufacturing, often also referred to as 3D printing, differs from the known classical cutting technologies in that the manufacturing material is predominantly not successively removed, but rather the object to be formed is built up layer-by-layer. For example, material layer is applied over material layer and the respective layers are partially solidified, for example, by local melting or sintering, and converted into a final material state. The starting material can be provided in loose powder or viscous form for this purpose.

To monitor such a production process, Bin Zhang et al propose, in "In situ surface topography of laser powder bed fusion using fringe projection", Additive Manufacturing, 12 (2016), pages 100-107, coupling a projector together with a camera to a manufacturing chamber in such a way that triangulation data with respect to the production area can be generated and thus sintered metal plies can each be metrologically captured.

A similar approach is followed by William S. Land II et al. in "In-Situ Metrology System for Laser Powder Bed Fusion Additive Process" Procedia Manufacturing, Volume 1, 2015, pages 393-403.

Due to the layer-by-layer buildup of workpieces in additive manufacturing, further critical manufacturing properties result in addition to the classic maintenance of geometric manufacturing tolerances. Internal object properties are entering the foreground increasingly for this purpose. In other words, this means that for additive manufacturing it has to be ensured in particular that the material condition in the body interior corresponds to a target specification, i.e., solidification also takes place in the interior as desired in accordance with the respective manufacturing method. Moreover, undesired material tensions, cracks, or air inclusions are to be avoided in a finished object.

In addition, with the above manufacturing methods, real-time monitoring (in-process) of the manufacturing process can often already be desired to be able to establish possible deviations already during the manufacturing.

Present standard measuring devices such as a coordinate measuring machine are not equipped sufficiently extensively or designed suitably for the detection of such effects. Superficial deviations such as cracks or deformations can be detected thereby, however, possible flaws in the body interior are regularly not measurable. Moreover, a measurement during the manufacturing, i.e., typically on a material which has not yet reached the final material state, cannot be carried out reliably.

SUMMARY

It is therefore the object of some embodiments of the present invention to specify a method and a corresponding device, which provide improved object checking of an object to be manufactured by means of additive manufacturing.

In particular, it is the object of some embodiments of the invention to make an additively manufactured object checkable with respect to a structural integrity.

These objects are achieved by the implementation of the characterizing features of the independent claims. Features which refine the invention in an alternative or advantageous manner can be inferred from the dependent patent claims.

According to one embodiment of the invention, the combination of an optical monitoring arrangement with a unit for additive manufacturing of objects, in particular with a 3D printer, is proposed. The optical monitoring arrangement is proposed in particular in this case as a scanner operating according to the measurement principle of triangulation. Such a scanner has for this purpose two cameras having a fixed and known position relationship to a projection unit, which is also provided.

The measurement information is to be generated in this case for the interior of a manufacturing volume. The information which can be generated using the scanner is especially to comprise a reference to the object to be manufactured and/or to the raw material from which the object is to be manufactured. The optical monitoring arrangement is preferably provided outside the manufacturing volume for this purpose. If the manufacturing volume is designed as a closed chamber, viewing windows, for example, can thus be provided in the housing for beam transmission, i.e., for example, for a projection of measuring radiation into the interior of the chamber and for a capture of light from the chamber by means of the cameras.

The scanner is configured and arranged in particular in such a way that the measurement information which can be generated thereby can be generated with respect to a manufacturing area of the manufacturing unit. If a 3D printer is used, which is configured to produce an object from a powder bed, the measurement information can be able to be generated with respect to the powder bed. It is of interest for this purpose for the monitoring of the production, for example, which state the powder bed has, i.e., whether the powder bed is sufficiently flat or whether the size of the powder particles corresponds to the desired requirements, for example.

The monitoring arrangement can be used, on the one hand, during the buildup of an object for monitoring or adaptation of the process and, on the other hand, the stored and analyzed data can be used for quality control after finishing of the object.

During the buildup of the object, in particular the mean layer thickness of the applied material and its variation over the application region are of interest as feedback for the device, for example, to regulate the power of the writing laser. The layer thickness may be ascertained as a difference of two measured 3D surfaces, in particular in consideration of the sinking of the writing region between two material applications. A measurement of the layer thicknesses is possible using the optical checking system according to the invention.

In addition to the layer thickness of the material application (powder), the geometry growth of the written objects is also measurable for feedback during the behavior, to engage correctively if necessary here.

The object regions can be identified by a stronger height sinking of the molten material in relation to the surrounding powder having air inclusions. It is also to be expected that the reflection properties of the object regions differ from the powder regions. The roughness of the surface of the object also differs in relation to that of the powder, and thus also enables an identification of the object regions. That is to say, the image regions which are to be associated with the object are determinable from the 3D data together with the intensity values of the camera images (maximum intensity value per pixel in the case of phase shifting or a separate bright recording).

If a location deviation of the measured object geometries occurs during the method, a correction of the writing position or also a termination of the process is implementable if it is recognized that defined tolerances are exceeded.

Some embodiments of the invention thus relate to a system for additive manufacturing, which can be monitored, of an object, having a manufacturing unit, which is designed for additive manufacturing of the object based on metal-containing manufacturing material, in particular powdered, granulated, and/or wire-shaped manufacturing material, in a manufacturing volume, in particular a 3D printer.

The object can be built up in a manufacturing cycle by means of repeated layer-by-layer provision of the metal-containing manufacturing material in a defined quantity, and at least partial, accurately-positioned forming of the provided manufacturing material, in particular by partial melting of the manufacturing material.

The layer-by-layer provision of the material is generally to be understood in this case so that the manufacturing material is provided for the (individual) layer or ply of the object to be currently produced. The manufacturing material can thus be kept ready and/or guided, for example, in the form of a material thread along the layer-related object contour. In particular but not exclusively, the layer-by-layer provision can be understood as a provision of the material in the form of a planar layer or level (of defined thickness) (for example, powder bed).

The system furthermore comprises an optical checking unit having at least one projector and one first camera. Moreover, a control and processing unit is provided, which is designed at least for controlling the manufacturing unit.

The manufacturing volume is preferably designed as thermally insulated and comprises at least one optical transmission region (for example, viewing window). The transmission region is designed in such a way that light, which can be generated using the projector, penetrates the transmission region, and also light and/or reflections, which are generated in the manufacturing volume because of the projection, can be transmitted through such a region. In other words, the transmission region has a transmissivity to light having projection wavelength and detection wavelength.

The projector and the camera are arranged outside the manufacturing volume. This has the advantage that soiling of the checking unit because of vapors or particles arising during the production process can be avoided. Moreover, the checking unit can thus remain untouched by further production-related influences (for example, temperature).

The projector and the first camera are aligned in such a way that respective optical axes defined by the camera and the projector each extend through one of the (at least one) transmission windows, by means of the projector a projection can be generated on a manufacturing area inside the manufacturing volume, and at least a part of the manufacturing area which can be projected onto can be captured by means of the camera. The arrangement thus enables a light projection or pattern projection in the direction of the manufacturing area and simultaneously a capture of images of the projection thus able to be generated. An item of manufacturing information with respect to the inner manufacturing area can thus be generated, for example, according to the principle of triangulation, wherein the light source and also the detectors of the checking unit are arranged outside the volume. The measurement information is embodied in particular by one or a plurality of three-dimensional position measurement points, for example, a 3D point cloud.

An item of manufacturing information with respect to the manufacturing area and/or with respect to the provided and/or formed manufacturing material can be generated based on the capture of the projection. The manufacturing information can represent, for example, a layer thickness or surface roughness of the object and can be generated by means of comparison of measurement data for multiple individual layers or on the basis of an intensity analysis. The manufacturing information is moreover transferable to the control and processing unit.

The control and processing unit is designed to receive and process the manufacturing information and to adapt the control of the manufacturing unit based on the manufacturing information during the manufacturing cycle or between two manufacturing cycles. The checking unit can thus provide measurement data or the derived manufacturing information as feedback and the manufacturing can be adapted and/or regulated on the basis of this input. Thus, for example, deviations which can occur during the production due to, for example, external influences (for example, offset of a material ply due to thermal influence or mechanical impact) can be compensated for.

In one embodiment, the optical checking unit can comprise a second camera, wherein the second camera is also arranged outside the manufacturing volume and is aligned in such a way that respective optical axes defined by the first and the second camera and the projector each extend through one of the transmission regions and at least a common part of the manufacturing area on which the projection can be overlaid can be captured in each case by means of the first and the second camera. In other words, an associated, individual transmission region can be provided for each optical axis.

The two cameras can be fixedly positioned in relation to one another. A relative location (in 6DOF) of the cameras in relation to the chamber can be determined by means of photogrammetric markings adjacent to or in the manufacturing region. Alternatively, the two cameras can be positioned without a fixed, known position relationship. The accurate location of each individual camera can then be determined by photogrammetry, for example, on the basis of the markings, wherein production-related influences can be compensated for in this way for each measurement. This permits a significantly more flexible use of the cameras in the event of significant temperature changes.

At least one of the cameras can be arranged and/or configured in such a way—in particular with respect to a depiction of the manufacturing area—that in this way the Scheimpflug condition is met. The projector can also be arranged and configured in such a way that in this way the Scheimpflug condition is met—for example, with respect to a projection on the manufacturing area.

The Scheimpflug condition generally states that in an optical depiction, image plane, objective plane, and focus plane intersect in a common straight line. The desired object plane can then be depicted with maximum sharpness. The sharply imaged object plane referred to as the focus plane can thus be an inclined plane if either the objective plane or the image plane of a camera is inclined.

Both the image sensors of the cameras and also the mask in the projector can be in Scheimpflug arrangement in relation to the measuring plane (manufacturing area) to permit a uniformly sharp projection of the mask and also its depiction of the plane on the image sensors. In particular for the projection objective lens, an opening of the aperture (low F-number) having a large light yield and NA can thus be enabled. The camera objective lens can have a smaller aperture, but a desired resolution can be achieved by the Scheimpflug arrangement.

Moreover, the two cameras (or also only the one camera) can be arranged substantially thermally decoupled from the manufacturing volume. Possible thermal effects which can occur on the part of the manufacturing unit thus have no or only negligible effects on the functions, measurement accuracy, or reliability of the checking unit. A calibration of the checking unit can thus remain valid during a plurality of measurement procedures. Temperatures of approximately 500° C. can occur inside the manufacturing volume during a production.

For a further thermal protection, mechanical apertures (shutters) can be provided inside the manufacturing chamber below the transmission windows of the cameras and the projector, which apertures are only opened during the recording time and otherwise keep away the transmission of thermal infrared radiation from the measuring system in the closed state. Undesired heating from the manufacturing volume can thus be efficiently reduced. In addition, during the writing process (additive manufacturing by means of a writing laser, which forms the material), possible reflections of the writing laser out of the object plane in the direction of the measuring system components are blocked.

In other words, the system can comprise at least one aperture usable as a shutter, which interacts with one of the optical axes of the camera or the projector in such a way that a transmission of electromagnetic radiation, in particular infrared radiation, into the camera or the projector, respectively, is blockable, in particular wherein the aperture is arranged in the manufacturing volume.

In one embodiment, the projector can moreover be arranged substantially thermally decoupled from the manufacturing volume.

According to one embodiment, the control and processing unit can comprise a measuring functionality, upon the execution of which at least a first capture of a first image using the first camera, a second capture of a second image using the second camera, and a derivation of an item of manufacturing information based on the captured first and captured second image take place, in particular based on the common part captured in the images of the manufacturing area which can be overlaid with the projection, and in consideration of the known position relationship.

The items of image information which can be generated using the first and the second camera can be processed jointly for this purpose to form an item of measurement information. For this purpose, a respective image pair can be processed by means of image processing and items of position information can be derived therefrom according to the principle of triangulation. An image pair can comprise for this purpose an image captured using the first camera and an image captured using the second camera, wherein these images are assigned to one another or captured in a synchronized manner, for example.

The derivation of the manufacturing information can thus be performed by means of image processing.

During the capture of the first and the second image, a projection of projection light onto the manufacturing area can preferably be carried out. An item of three-dimensional position information for the captured region can be derived by image-based analysis of the projection pattern which can thus be captured on the manufacturing area. External and/or internal camera parameters can be taken into consideration in this case. A plurality of measurement points for the object and an item of information on the manufacturing progress or the manufacturing quality can thus be generated.

External parameters relate, for example, to the orientation of a camera in relation to another object. A change of the relative orientation between camera and 3D printing can be ascertained and corrected using known 3D information of a marking captured using the camera.

Internal parameters relate to, for example, the optical geometry in the interior of the camera and its calibration. If an internal parameter changes during the printing process, an updated internal parameter can be ascertained and corrected by an iterative algorithm on the basis of the captured marking, without having to interrupt the printing process and carry out a new calibration.

In particular, a three-dimensional representation of the manufacturing area (thus also for the object resulting or located thereon) can be derived as the manufacturing information based on the captured first and captured second image, in particular wherein the three-dimensional representation is a 3D point cloud.

The manufacturing volume can be designed as thermally insulated in particular, wherein the transmission region is designed as a transmission window. A housing is typically provided around the manufacturing volume for this purpose, which comprises a thermal insulation functionality and thus provides shielding of the housing interior from the surroundings. Corresponding viewing windows can be provided in such a housing, which permit a radiation passage for the purpose of the measurement using the checking unit.

To keep the influence of possible temperature changes on the measuring system as small and/or negligible as possible, in one embodiment a temperature of at least one of the cameras can be able to be actively regulated by means of the control and processing unit, wherein ventilation, water cooling, and/or a Peltier element is provided on the part of the at least one camera and is controllable by means of the control and processing unit.

In order that the measuring system is little influenced by the temperatures in the manufacturing chamber, the cameras and/or the frame can be actively temperature-regulated. Firstly, the cameras and/or the frame can be ventilated using fans, so that they are more in thermal contact with the surroundings than with the manufacturing chamber. The temperature can be further stabilized with the aid of temperature sensors and Peltier elements. In particular, an active temperature regulation of the mechanical interface between objective lens and camera is advantageous, because this reduces or blocks the heat propagation toward the camera and thus important optical parts (for example, objective lens, interface, image sensor) are thermally stabilized.

Using a hollow frame (for example, CFRP pipes or hollow metal profiles), the frame can be internally ventilated or thermally stabilized using coolant liquid. The frame can then be externally insulated. Aluminum then also comes into consideration as a manufacturing material due to the temperature stabilization of the frame.

In particular, the cameras and the projector can be arranged on a frame and a temperature of the frame can be actively regulated by means of the control and processing unit. In this case, the frame can be embodied in particular as a hollow frame and a ventilation element (for example, fan) can be provided for the internal ventilation of the frame.

A temperature sensor can be provided on the frame and/or at least one of the cameras and/or the projector to generate a control input.

According to one embodiment, at least one of the optical axes can be aligned orthogonally to the at least one optical transmission region or window.

The manufacturing volume can comprise in particular three optical transmission windows, wherein one of the optical axes is assigned to each of the transmission windows and extends in each case orthogonally through the assigned transmission window.

Due to the orthogonal alignment of the optical axes, aberrations or undesired light reflections can be avoided.

Alternatively, if a high objective f-number (small aperture) and a thin plane plate are used, the optical axis can remain diagonally aligned, since the aberration caused by the transmission window becomes negligible.

A housing of the manufacturing unit can thus comprise, for example, three viewing windows. Measuring radiation can be projected into the interior of the volume through one of the windows. The projection which can thus be generated can be captured using each of the two cameras, wherein each camera achieves the capture via a respective different window. Moreover, a high level of flexibility with respect to the arrangement of the checking components (cameras and projector) can be achieved by the assignment to different viewing windows.

Some embodiments of the invention moreover relate to a measuring method for an additive manufacturing process of an object. The monitoring method comprises at least one additive manufacturing of the object using metal-containing manufacturing material, in particular powdered, granulated, and/or wire-shaped manufacturing material, in particular 3D printing, in a manufacturing volume by means of repeated execution of a manufacturing cycle or step.

The manufacturing cycle is executed with a provision of the metal-containing manufacturing material in defined quantity and position and at least partial, accurately-positioned forming of the provided manufacturing material, in particular by partial melting of the manufacturing material. A three-dimensional object can be produced as a result by the repeated execution of such a cycle.

In the scope of the method, an item of manufacturing-related manufacturing information is moreover generated during at least one portion of the additive manufacturing.

The manufacturing information is generated with a generation and emission of a projection light outside the manufacturing volume. Moreover, via at least one light transmission region (for example, viewing window) of the manufacturing volume, a projection of the projection light onto a manufacturing area in the manufacturing volume, a first capture of a first image using at least one part of the projection of the projection light outside the manufacturing volume, and a second capture of a second image using at least one part of the projection of the projection light outside the manufacturing volume take place.

In this case, a common part of the projection is captured in the first image and in the second image and the projection, the first capture, and the second capture take place using a fixed and known relative position relationship.

Furthermore, a derivation of the manufacturing information is carried out based on the captured first and captured second image and in consideration of the known position relationship.

In particular, a three-dimensional representation of the manufacturing area can be derived as the manufacturing information based on the captured first and captured second image, in particular wherein the three-dimensional representation is a 3D point cloud.

The three-dimensional representation can be generated by an identification of features of the manufacturing volume in the first and second images, a determination of respective identical features in the first and second images and respective image positions of the features in the first and second images (based on image processing), and a derivation of a three-dimensional position for the features on the basis of the image positions (for example, by means of triangulation based on the image positions and the known position relationship of the cameras in particular). The features can be generated, for example, by the projection on the part of the projector (for example, light patterns) or can be structural features provided because of manufacturing (for example, a contour of the object to be produced).

To provide suitable measuring conditions, the projection light can be generated as structured illumination, in particular can be generated as a sequence of different patterns, and the three-dimensional representation can be derived on the basis of the structured illumination. A pattern or a sequence of patterns can thus be projected on the area and observed and captured on the basis of the cameras. The 3D point data can be generated with improved accuracy (for example, by averaging) and improved reliability (for example, for regions having difficult illumination conditions) by the projection of different patterns or a moving pattern.

In one embodiment, a marking provided in a known position relationship to the manufacturing area can be captured in the first and/or the second image and the position of the captured marking in the first and/or in the second image can be processed during the derivation of the process information. A state of the manufacturing unit, in particular a temperature in the manufacturing volume, can thus be concluded on the basis of an image position of the marking in at least one of the images and a comparison to a prior or stored reference position. For example, a (radial) expansion of the manufacturing area because of higher temperatures can be established.

In particular, an item of temperature information for the manufacturing volume can be derived on the basis of a comparison of the known position relationship to the image position of the captured marking in the first and/or in the second image. For a quantitative derivation of this information, a preceding calibration can preferably be used, for example, an assignment of an extent of a position deviation of the marking to a temperature difference.

Alternatively, a monitoring and a correction of the external and internal camera parameters can be carried out on the basis of the marking. This is advantageous in particular if the position and internal geometry of the camera changes during a long-lasting printing process.

In the scope of additive manufacturing, a position variation, in particular lowering, of the manufacturing area can take place after execution of a manufacturing cycle, wherein a measured extent of the position variation is processed during the derivation of the process information or the position variation is adapted based on an item of process information derived with respect to the extent of the position variation.

In other words, a layer-by-layer lowering of the printing region can be precisely performed and monitored via a mechanical drive having encoder. This movement can be used as an additional monitor function for the measuring system, whereby in-line temperature effects (with respect to the production) may be eliminated in the measuring system.

If the drive of the printing plate (manufacturing area) is otherwise inaccurate (for example, because of temperature influences), the measuring system can be used to observe and correct the movement (closed-loop use). The actual lowering of the manufacturing area can thus be controlled by the movement monitoring.

According to one embodiment, a defined monitoring structure can (also) be built up in the scope of the additive manufacturing and the process information can be generated with respect to the monitoring structure. Thus, for example, columns can also be printed during the printing on the peripheral region, via which a direct check of a laser writing process is possible, i.e., markings may more or less also be printed in the writing region. A statement on the precision of the additive manufacturing of the object built up in parallel can then be made on the basis of this structure. A target shape and target size of the monitoring structure are known for this purpose. In particular, a template is stored for the structure. The information with respect to the manufacturing quality can thus be derived by a comparison of a measurement on the monitoring structure to the known target parameters.

Moreover, an analysis of respective printed object layers can be carried out (for example, comparison to design data for the object). Correction parameters for the writing laser and/or a deflection unit for the laser (mirror galvanometer) can be derived in-line from the analysis.

It is obvious that respective embodiments of the method can be combined with those of the system.

BRIEF DESCRIPTION OF THE DRAWINGS

The method according to the invention and the device according to the invention are described in greater detail solely by way of example hereafter on the basis of specific exemplary embodiments schematically illustrated in the drawings, wherein further advantages of the invention will also be discussed. In the specific figures.

DETAILED DESCRIPTION

Figure 1:
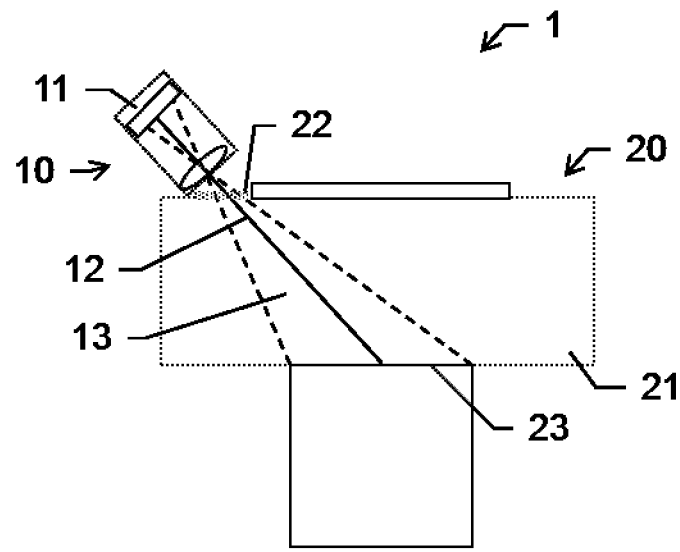
FIG. 1 schematically shows a construction of the checking system according to the invention in a side view.
Figure 2:
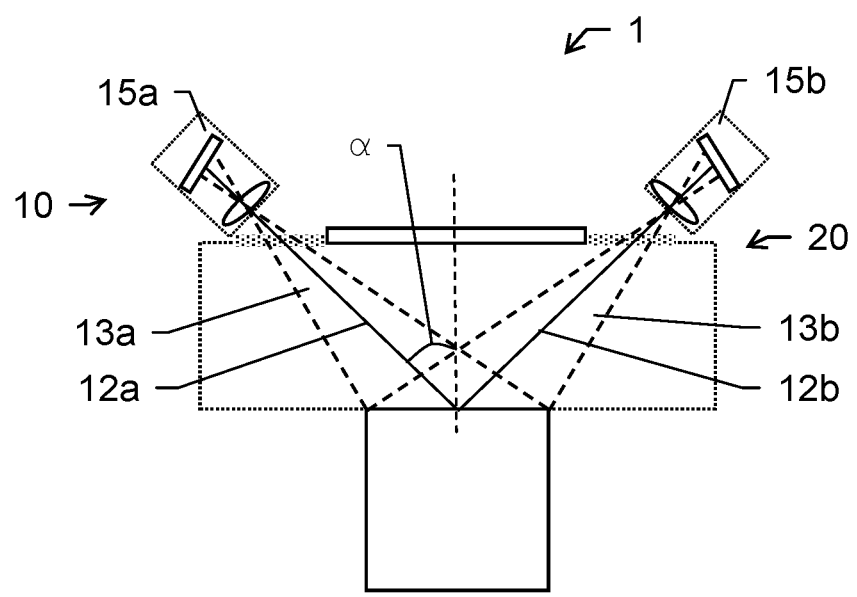
FIG. 2 schematically shows a construction of the checking system according to the invention in a frontal view.

FIG. 1 shows an embodiment of a system 1 for the monitored additive manufacturing of an object according to the invention in a side view. The system consists of a manufacturing unit 20, i.e., a 3D printer here, and an optical checking unit 10. In the view shown, a projection unit 11 is illustrated as part of the checking unit 10. The two associated cameras are illustrated in FIG. 2.

The projection unit 11 defines an optical axis 12 and a field of view 13, within which a light projection can be oriented through a viewing window 22 into the interior of the manufacturing volume 21. Light can thus be emitted by means of the projection unit 11 and oriented in the direction of a manufacturing area 23 of the manufacturing unit 20. A defined projection can thus be generated on the manufacturing area 23.

The projection unit 11 is arranged thermally decoupled from the manufacturing unit 20. Both the cameras and also the projection unit 11 can be connected to one another for this purpose by a stable frame. This frame can preferably consist at least in part of a thermally inert material (for example, Invar, carbon). The frame can alternatively or additionally be embodied as thermally insulated from the construction chamber using insulation material. Thermally-related influences on the arrangement can thus be minimized. The measuring system can thus be designed and arranged as thermally decoupled as possible so that a calibration of the system remains valid even at high temperatures. In the 3D printing chamber (manufacturing volume 21), temperatures of 200° C. to 500° C. or higher can be reached because of the manufacturing process. A comparatively large influence on the structure of the system can thus result.

The 3D printer shown is a printer which is capable of building up a three-dimensional structure from a powder bed. For this purpose, a metal-containing powder (or granulate) is applied at a defined layer thickness to the manufacturing area 23. The powder is distributed smoothly on the area 23, for example, by means of a doctor blade. The powder can firstly be introduced into the manufacturing volume 21 for this purpose and then pulled or pushed over the area 23 using the doctor blade. Subsequently, partial solidification of the powder is performed by corresponding partial melting of the powder using oriented laser radiation. A thin layer (ply) of an object to be produced can thus be created.

The control of the material solidification is typically based on a digital model (for example, CAD model) of the object to be produced. For this purpose, the object can be represented as a stack of single plies and the solidification can be executed in each case in accordance with the current ply to be produced in points or in accordance with the object contour for this ply. In other words, the laser beam is deflected in a controlled manner on the basis of the respective ply to be produced.

After the layer-related solidification, the powder bed is lowered, in particular in accordance with the thickness of the previously solidified layer. A new ply of the metallic powder raw material is applied, distributed, and solidified as a next layer. A second solid ply of the object results in this way, which is bonded by the melting procedure to the first ply. An object of nearly arbitrary shape can be built up layer-by-layer inside the manufacturing area 23 by repeated execution of these steps.

The checking unit 10 is provided here for monitoring and checking the manufacturing process. As shown in FIG. 2, the checking unit 10 (frontal view) comprises at least the two cameras 15*a* and 15*b*, in addition to the projector 11.

The projector 11 can be arranged centrally between the two cameras 15*a*, 15*b* and moreover laterally offset, so that an upper viewing window for the process chamber 21 remains free. The projector 11 can moreover preferably be aligned at an advantageously small angle in relation to the upper viewing window, to avoid concealment by, for example, a gas inlet.

In the proposed checking unit 10, the cameras 15*a*, 15*b* can be designed in particular as 50-megapixel cameras, to achieve a desired lateral resolution of less than 60 µm within the entire field of view (having, for example, a field diagonal of 200 mm). The desired resolution is preferably selected here in accordance with the average size of the powder particles of the manufacturing raw material and/or the applied layer thickness. A respective triangulation angle α in relation to the optical axis of the central viewing window of the two cameras 15*a*, 15*b* can be selected as relatively large for this purpose, for example, 45°.

The projector 11 is preferably designed in such a way that a sinusoidal strip pattern (with respect to the intensity distribution) having a strip interval of 0.4 mm is projectable at high contrast. This enables a signal capture with low noise. The aperture of the projector 11 can be selected as large as possible in this case to permit only a small speckle contrast on rough surfaces ($R_a$<0.1 µm).

In this case, instead of the use of projector-camera pairs, a real camera-camera pair (with projector) as a measuring instrument in combination with structured illumination by the projector is thus proposed. The typical clear thermal strain of the projector does not affect the measurement accuracy in this case. The thermal stability of the overall system is thus significantly improved.

In addition to a structured illumination (with phase shift), the measuring method can also be operated or supplemented with a photogrammetric recording and analysis. The projector is (only) used in this case for uniform illumination. On the basis of identifiable features in the object space, a three-dimensional location of these features and thus coordinates can be determined using a bundle equalization calculation or by means of stereo matching for the stereo camera arrangement.

The projection of a pattern having random intensity distribution as an artificial texture is also a variant for a measurement. The achievable lateral resolution can be lower in this case, but a 3D point cloud can be generated using a single synchronized recording of the two stereo cameras.

The cameras 15*a*, 15*b* and the projector 11 can be in a Scheimpflug arrangement (meeting the Scheimpflug condition) in relation to the measuring plane. In particular, both the image sensors of the cameras 15*a*, 15*b* and also a projection mask in the projector 11 are in a Scheimpflug arrangement in relation to the measuring plane. The image sensors are arranged tilted in relation to the optical axis. A uniformly sharp projection of the mask and also its depiction from the checking plane on the image sensors can thus be generated. In particular for the projection objective lens, an opening of an aperture (small F-number) having a large light yield and numeric aperture (NA) can thus be enabled. The camera objective lens can comprise a smaller aperture. The Scheimpflug arrangement contributes decisively to fulfilling the comparatively ambitious resolution claims.

The projection unit 11 can be embodied as an analog projector (in contrast to a digital projector) having a finely structured mask (slide), which enables an ultrahigh depth resolution (approximately 1 µm) over a large projection field of several hundred millimeters. The location bandwidth product achievable in this way (number of the points to be resolved) can typically be implemented not at all or only with difficulty using a digital projector.

The object structures observable using the checking system 10 can have a high reflectivity at some points, for example, due to melting and cooling of the raw material. For reliable capture of such regions as well, an HDR mode (high dynamic range) can be provided for the camera. Alternatively or additionally, multiple recordings can be generated using different exposure times to achieve a higher image dynamic range in comparison to a standard single recording.

In addition to a calibration of the two cameras 15*a*, 15*b* in relation to one another, a calibration between the individual cameras 15*a*, 15*b* and the projector 11 can also be provided, to nonetheless enable an analysis in the case of specular (overloaded) regions in one of the camera images. Only one camera-projector pair can then be used here for the triangulation analysis. A greater robustness of the system can thus be achieved. Moreover, an HDR capture can be carried out without complex multiple exposures in this way (measuring time gain).

Figure 3:
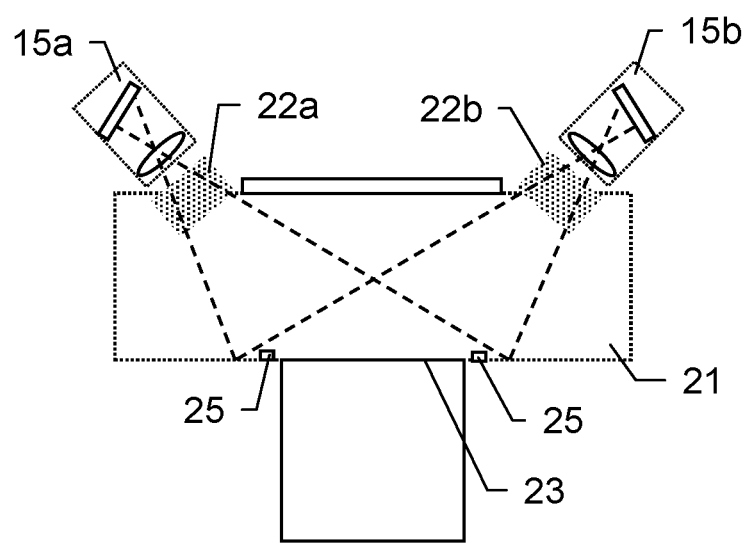
FIG. 3 shows a further embodiment of the checking system.

FIG. 3 shows a further embodiment of a system according to the invention. The construction of the 3D printer and the projector and also of the two cameras of the checking unit 10 is comparable to those of FIGS. 1 and 2.

Identical elements are identified by identical reference signs.

In addition to the manufacturing area 23, marking elements 25 are provided in the manufacturing volume 21. In addition to the analysis of the circular printing region, the markings 25 can also be used to eliminate possible temperature effects on the measuring system, by evaluating the correlation between temperature change and change of the mark positions. In other words, a reference position can be stored for the markings 25, which specifies a normal state of the system. This position can be verified or established by means of one or both cameras in an image-based manner (by means of image processing).

On the one hand, the monitoring of the marker positions enables the quantitative determination of a thermal influence on the printer, on the other hand, a qualitative statement about the thermal state of the system can be made on the basis of a known drift behavior of the marker 25. A direct image-based temperature determination can thus be carried out. Calibration is to be provided for this purpose in particular, i.e., respective marker positions are associated with respective temperature states.

By means of a position determination of the markings 25, an in particular radially-symmetrical drifting (scaling) of the marker positions around the printing region (manufacturing area 23) can be recognized. This can also be traced back to a temperature increase inside the chamber 21. An accompanying position change of the object to be produced in the manufacturing chamber 21 can be derived on the basis of such a determination and the additive manufacturing process can be adapted accordingly.

Moreover, monitoring and correction of the applied camera parameters (internal and external) is accessible by means of the capture of the markings 25, which can have a specific position in relation to the manufacturing chamber. Thus, for example, a position drift of the camera or a change of the internal structure as a result of temperature influences, for example, can be compensated for.

In the embodiment shown, the viewing windows 22a, 22b, through which the two cameras 15a, 15b can capture a projection in the interior of the chamber 21, are aligned in relation to the cameras 15a, 15b in such a way that a respective optical axis of the cameras 15a, 15b is aligned orthogonally to the respective viewing window 22a, 22b. The observation windows 22a, 22b for the chamber are thus to be arranged perpendicularly to the optical axis of the objective lenses. In this way, aberrations—in particular in the case of greater window thickness and/or larger objective lens aperture—can be minimized. Moreover, the viewing windows 22a, 22b can be manufactured from a material having very good thermal conductivity and low coefficient of thermal expansion (for example, sapphire). Deformations due to heating can thus be minimized. In an alternative embodiment, the windows 22a, 22b can (additionally or alternatively) be actively cooled. The windows can alternatively or additionally be provided with a dielectric coating for insulation with respect to the thermal radiation.

Figure 4:
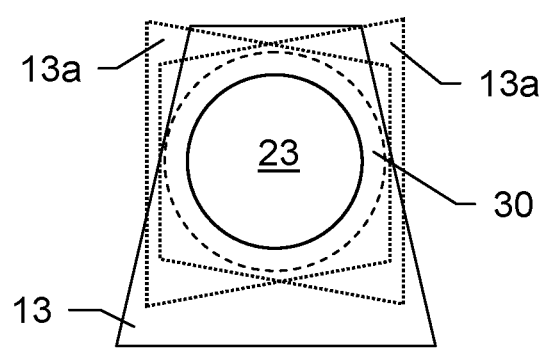
FIG. 4 schematically shows an arrangement of respective fields of view of a checking system according to the invention.

FIG. 4 shows an effective field of view 30, which is created using a checking unit according to the invention, for the capture of measurement data. The field of view 30 is created by the arrangement of the cameras and the projector of the checking unit and by the design of the optical components thereof in such a way that a manufacturing region 23, in particular a manufacturing area, of a manufacturing unit is completely covered or comprised by the effective field of view of the scanner formed (checking unit). According to specific embodiments, solutions are also conceivable according to the invention, wherein only a part of the manufacturing area is captured by a scanner. A simultaneous arrangement of multiple such scanning constructions is furthermore conceivable to capture the manufacturing area in its entirety (also redundantly).

The projection field of view 13 which can be covered using the projector can be partially captured using both cameras. The size and shape of the capture fields of view 13a and 13b of the cameras thus define the boundaries of the effective scanning region 30 together with the available projection field of view 13. The scanning region 30 thus corresponds to the region within which measurement data, in particular 3D coordinates, can be produced with respect to the manufacturing region 23.

The project which has resulted in the present patent application has obtained financing on the part of the EU program for research and innovation "Horizon 2020" under the grant agreement No. 690689.

It is obvious that these illustrated figures only schematically illustrate possible exemplary embodiments. The various approaches can also, according to the invention, be combined with one another and with methods of additive manufacturing or optical object measuring of the prior art.

What is claimed is:

1. A system for monitored additive manufacturing of an object, the system comprising:
a manufacturing unit configured for additive manufacturing of the object using metal-containing manufacturing material, in a manufacturing volume comprising at least one optical transmission region, wherein the object is built up in a manufacturing cycle by repeating a process of:
providing the metal-containing manufacturing material layer-by-layer in a defined quantity, and
accurately-position forming the provided manufacturing material,
an optical checking unit comprising:
one projector, and
a first camera; and
a control and processing unit, which is designed at least for controlling the manufacturing unit,
wherein:
the projector and the first camera are arranged outside the manufacturing volume and are aligned in such a way that:
respective optical axes defined by the first camera and the projector each extend through at least one transmission region,
a projection is generated on a manufacturing area inside the manufacturing volume by means of the projector,
at least a part of the manufacturing area on which the projection is overlaid is captured by means of the first camera, and
an item of manufacturing information with respect to the manufacturing area or with respect to the provided or formed manufacturing material can be generated based on the capture of the projection,
the manufacturing information is transferable to the control and processing unit,
the control and processing unit is designed to receive and process the manufacturing information and to adapt the control of the manufacturing unit based on the manufacturing information during the manufacturing cycle or between two manufacturing cycles,
the optical checking unit comprises a second camera, and the second camera is arranged outside the manufacturing volume and is aligned such that:
respective optical axes defined by the first and the second camera and the projector each extend through a transmission region, and
at least a common part of the manufacturing area on which the projection can be overlaid can be captured in each case by the first and the second camera,
the control and processing unit comprises a measuring functionality, upon the execution of which a method is performed, the method comprising:
a first capture of a first image using the first camera, a second capture of a second image using the second camera, and a derivation of the manufacturing information based on the captured first and captured second image are carried out, based on the captured first and captured second image, a three-dimensional representation with respect to the manufacturing area is derived as the manufacturing information, and the projection is generated as a sequence of different patterns and the three-dimensional representation is derived from the sequence of different patterns.

2. The system 1 according to claim 1, wherein:

at least the first and/or the second camera is:
- a. essentially thermally decoupled from the manufacturing volume, or
- b. in a fixed position relationship to the manufacturing volume, or
- c. fulfilling the Scheimpflug condition with respect to the capture of the manufacturing area using the camera or the projection on the manufacturing area using the projector, respectively.

3. The system according to claim 1, wherein:
- d. the manufacturing information represents an item of information with respect to:
  - i. a mean layer thickness of one or more individual layers of the provided or formed manufacturing material,
  - ii. a layer thickness variation in the region of the manufacturing area,
  - iii. a geometry growth of the object due to application of a specific number of individual layers, or
  - iv. a surface roughness of the object.

4. The system according to claim 1, wherein the manufacturing volume is designed as thermally insulated and the transmission region is designed as a transmission window.

5. The system according to claim 1, wherein:

a temperature of at least one of the cameras is actively regulated by means of the control and processing unit, wherein a ventilation or a Peltier element is provided and is controlled by means of the control and processing unit, or the first and the second camera and the projector are arranged on a frame and a temperature of the frame is actively regulated by means of the control and processing unit.

6. The system according to claim 1, wherein:

at least one of the optical axes is aligned orthogonally to the at least one optical transmission region, the manufacturing volume comprises three optical transmission windows and each one of the optical axes is assigned to one of the transmission windows, or the system comprises at least one aperture usable as a shutter, which interacts with one of the optical axes of the camera or the projector in such a way that a transmission of electromagnetic radiation into the camera or into the projector, respectively, is blocked.

* * * * *